(12) United States Patent
Guo et al.

(10) Patent No.: US 12,496,998 B2
(45) Date of Patent: Dec. 16, 2025

(54) BUCKLE

(71) Applicant: WONDERLAND SWITZERLAND AG, Steinhausen (CH)

(72) Inventors: Zheng-Wen Guo, Guangdong (CN); Manqun Cheng, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 16 days.

(21) Appl. No.: 18/747,890

(22) Filed: Jun. 19, 2024

(65) Prior Publication Data
US 2024/0336222 A1    Oct. 10, 2024

Related U.S. Application Data

(63) Continuation of application No. 17/776,495, filed as application No. PCT/EP2020/082074 on Nov. 13, 2020, now Pat. No. 12,049,189.

(30) Foreign Application Priority Data

Nov. 13, 2019 (CN) .......................... 201911107586.0

(51) Int. Cl.
*B60R 22/48* (2006.01)
*A44B 11/25* (2006.01)

(52) U.S. Cl.
CPC .......... *B60R 22/48* (2013.01); *A44B 11/2511* (2013.01); *A44B 11/2569* (2013.01); *B60R 2022/4816* (2013.01)

(58) Field of Classification Search
CPC ............ B60R 22/48; B60R 2022/4816; A44B 11/2511; A44B 11/2569; A44B 11/25; A44B 11/2542; A44B 11/2503
See application file for complete search history.

(56) References Cited

U.S. PATENT DOCUMENTS 3,833,781 A * 9/1974 Rumpf ..................... H01H 1/42
                                                        200/254
3,955,056 A    5/1976 Lindblad
(Continued)

FOREIGN PATENT DOCUMENTS

| CA | 3036875 A1 | 10/2019 |
|---|---|---|
| CN | 102266152 A | 12/2011 |

(Continued)

OTHER PUBLICATIONS

International Search Report mailed in corresponding International Patent Application No. PCT/EP2020/082074 on Feb. 19, 2021, consisting of 5 pp.

(Continued)

*Primary Examiner* — David M Upchurch
(74) *Attorney, Agent, or Firm* — Volpe Koenig

(57) ABSTRACT

A buckle (100) includes a male buckle (110), a female buckle (120), and an actuating structure (130) disposed between the male buckle (110) and the female buckle (120). When the male buckle (110) and the female buckle (120) are engaged, the actuating structure (130) generates an actuating (Continued)

signal. When the male buckle (110) and the female buckle (120) are disengaged, the actuating structure (130) generates a disconnecting signal. A control circuit operates according to the actuating signal or the disconnecting signal, such that the control circuit is actuated more conveniently and the structure of the buckle (100) is simple.

20 Claims, 18 Drawing Sheets

(56) References Cited

U.S. PATENT DOCUMENTS

| | | | |
|---|---|---|---|
| 4,001,532 A | | 1/1977 | Kubota |
| 2003/0155166 A1* | | 8/2003 | Sullivan ................ B60R 22/48 |
| | | | 180/268 |
| 2004/0066291 A1 | | 4/2004 | Tracy |
| 2007/0229244 A1* | | 10/2007 | Peeler ................... B60R 22/48 |
| | | | 340/686.1 |
| 2010/0244543 A1* | | 9/2010 | Fine ..................... B60N 2/2812 |
| | | | 297/484 |
| 2011/0080279 A1 | | 4/2011 | Lanter |
| 2014/0052342 A1* | | 2/2014 | Seibert ................ B60N 2/2816 |
| | | | 701/45 |
| 2018/0078001 A1* | | 3/2018 | Babin .................. A44B 11/2511 |
| 2018/0082563 A1 | | 3/2018 | Cristella |
| 2020/0156589 A1* | | 5/2020 | Babin .................... B60N 2/265 |

FOREIGN PATENT DOCUMENTS

| | | |
|---|---|---|
| CN | 206729350 U | 12/2017 |
| DE | 202013103689 U1 | 11/2013 |
| EP | 1025774 B1 | 7/2004 |
| EP | 2298611 A2 | 3/2011 |
| JP | S511914 | 1/1976 |
| JP | 201162423 A | 3/2011 |
| TW | M430404 U1 | 6/2012 |
| TW | I466792 B | 1/2015 |
| TW | 201505575 A | 2/2015 |
| TW | M514416 U | 12/2015 |
| TW | I580370 B | 5/2017 |
| TW | M562604 U | 7/2018 |
| WO | 2018046024 A1 | 3/2018 |

OTHER PUBLICATIONS

Written Opinion mailed in corresponding International Patent Application No. PCT/EP2020/082074 on Feb. 19, 2021, consisting of 6 pp.

* cited by examiner

BUCKLE

CROSS-REFERENCE TO RELATED APPLICATIONS

This application is a continuation of U.S. patent application Ser. No. 17/776,495, filed on May 12, 2022, titled "BUCKLE", which is a U.S. National Phase of International Application No. PCT/EP2020/082074, filed on Nov. 13, 2020, titled "BUCKLE", which claims priority to Chinese Patent Application No. 201911107586.0, filed on Nov. 13, 2019, titled "FASTENER STARTING DEVICE", the entireties of which are incorporated by reference herein.

FIELD OF THE INVENTION

The present invention relates to a buckle, particularly a buckle capable of automatically actuating or disconnecting a control circuit of an electronic component.

BACKGROUND OF THE INVENTION

Various types of baby carriages (e.g. stroller, safety seat, baby holding belt, etc.) have been widely used in families with babies. The baby carriage cannot be used without a buckle. The conventional buckle only includes a male buckle, a female buckle, and a button. The male buckle and the female buckle are engaged and fixed with each other. The button is used to unlock the male buckle and the female buckle.

As the needs of people continue to increase and communication technology continues to innovate, various baby carriages are gradually used in conjunction with external control equipment or mobile communication equipment to control and monitor the usage status, connection status, etc. of the baby carriage through the external control equipment or mobile communication equipment. However, in the prior art, the external control equipment or mobile communication equipment in conjunction with the baby carriage is turned on or off by independent control, and it is not combined with the usage status, connection status and buckle of the baby carriage, resulting in complicated operation.

Therefore, it is necessary to provide a buckle capable of conveniently actuating an external control circuit to solve the aforesaid problems of the prior art.

SUMMARY OF THE INVENTION

The present invention aims at providing a buckle capable of conveniently actuating an external control circuit and the structure thereof is simple.

This is achieved by a buckle according to claim 1. The dependent claims pertain to corresponding further developments and improvements.

As will be seen more clearly from the detailed description following below, the claimed buckle has a control circuit. The buckle includes a male buckle, a female buckle, and an actuating structure disposed between the male buckle and the female buckle. When the male buckle and the female buckle are engaged, the actuating structure generates an actuating signal. When the male buckle and the female buckle are disengaged, the actuating structure generates a disconnecting signal. The control circuit operates according to the actuating signal or the disconnecting signal.

Preferably, the actuating structure includes a first conductive member and a second conductive member. One of the first conductive member and the second conductive member is electrically connected to the control circuit. The male buckle and the female buckle are engaged, such that the first conductive member and the second conductive member are in contact.

Preferably, one of the first conductive member and the second conductive member is disposed on the male buckle and another one of the first conductive member and the second conductive member is disposed on the female buckle. When the male buckle and the female buckle are engaged, the first conductive member and the second conductive member are in contact. When the male buckle and the female buckle are disengaged, the first conductive member and the second conductive member are disconnected.

Preferably, the first conductive member is fixed on the male buckle or integrally formed with the male buckle.

Preferably, the second conductive member is disposed on the female buckle and electrically connected to the control circuit. The second conductive member has two contact ends. When the male buckle and the female buckle are engaged, the first conductive member and the two contact ends of the second conductive member are in contact to make the control circuit conductive. When the male buckle and the female buckle are disengaged, the first conductive member and the two contact ends of the second conductive member are separated to disconnect the control circuit.

Preferably, the first conductive member is a conductive body disposed on the male buckle and the second conductive member is a conductive wire disposed on the female buckle.

Preferably, the first conductive member and the second conductive member are disposed on the female buckle. When the male buckle and the female buckle are engaged, the male buckle pushes the first conductive member or the second conductive member to make the first conductive member and the second conductive member in contact or separate.

Preferably, the first conductive member is an automatic ejection member disposed in the female buckle. The second conductive member is disposed on the female buckle and electrically connected to the control circuit. The second conductive member has two contact ends. When the male buckle and the female buckle are engaged, the male buckle pushes the automatic ejection member to make the automatic ejection member and the two contact ends of the second conductive member in contact.

Preferably, the first conductive member is a metal elastic plate of the automatic ejection member, a metal spring, or a conductive structure disposed on a metal elastic plate.

Preferably, the second conductive member is a conductive wire disposed on the female buckle.

Preferably, the second conductive member is two conductive pillars fixed in the female buckle. The two conductive pillars are electrically connected to the control circuit. The male buckle pushes the automatic ejection member to make the two metal springs and the two conductive pillars in contact.

Preferably, the first conductive member is a movable member of an automatic ejection member fixed in the female buckle. The second conductive member is a fixing member fixed in the female buckle and electrically connected to the control circuit. When the male buckle and the female buckle are engaged, the male buckle pushes the automatic ejection member to drive the movable member to move to make the movable member and the fixing member in contact or separate.

Preferably, the fixing member is a metal buckle having two contact ends apart from each other and the two contact ends are configured to detachably contact the movable member.

Preferably, the buckle further includes a switch disposed on the female buckle. When the male buckle and the female buckle are engaged, the male buckle drives the movable member to move through the automatic ejection member, such that the movable member detachably acts on the switch to make the switch and the fixing member in contact or separate.

Preferably, when the male buckle and the female buckle are engaged, the movable member is away from the switch to make the switch and the fixing member separate. When the male buckle and the female buckle are disengaged, the automatic ejection member ejects and pushes the movable member to move to press the switch to make the switch and the fixing member in contact.

Preferably, when the male buckle and the female buckle are engaged, the male buckle pushes the automatic ejection member to drive the movable member to press the switch to make the switch and the fixing member in contact. When the male buckle and the female buckle are disengaged, the automatic ejection member ejects to drive the movable member to move away from the switch to make the switch and the fixing member separate.

Preferably, the actuating structure includes a sensor disposed in the female buckle and electrically connected to the control circuit. The sensor is configured to sense the male buckle. The control circuit is conductive or disconnected according to a sensing signal of the sensor.

Preferably, the control circuit includes a Bluetooth module and the control circuit controls the Bluetooth module on or off according to the actuating signal or the disconnecting signal.

Preferably, the control circuit is disposed inside or outside the buckle.

Preferably, the control circuit includes a communication module configured to communicate with an external mobile device.

Compared to the prior art, the buckle of the invention has the actuating structure disposed between the male buckle and the female buckle. When the male buckle and the female buckle are engaged, the actuating structure generates the actuating signal. When the male buckle and the female buckle are disengaged, the actuating structure generates the disconnecting signal. The control circuit operates according to the actuating signal or the disconnecting signal, such that the control circuit can be actuated conveniently and the structure of the buckle is simple.

BRIEF DESCRIPTION OF THE DRAWINGS

In the following, the invention is further illustrated by way of example, taking reference to the accompanying drawings thereof.

DETAILED DESCRIPTION

Figure 1:
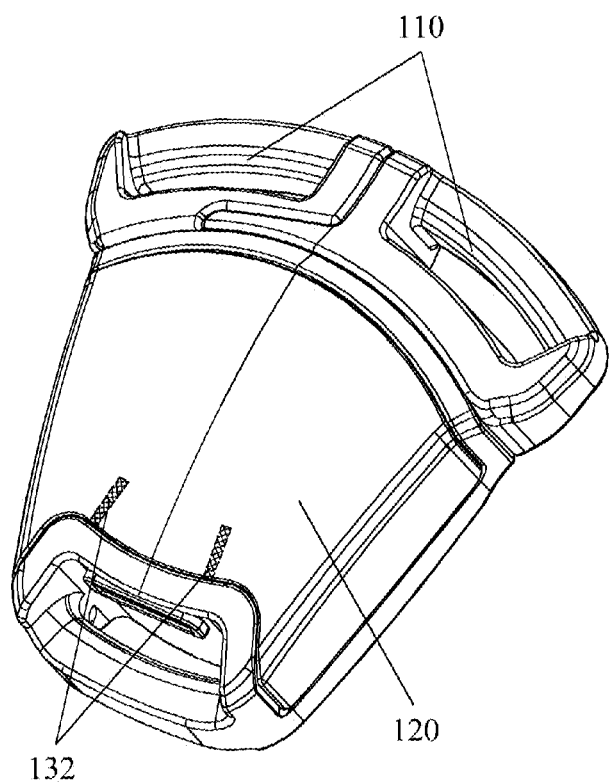
FIG. 1 is a schematic view illustrating the structure of a buckle of a first embodiment of the invention.

The embodiments of the invention will now be described with reference to the accompanying drawings, wherein similar numbers in the drawings represent similar elements. A buckle 100 provided by the invention has a control circuit and is mainly used for actuating or disconnecting the control circuit disposed on a baby carriage, but is not so limited. The buckle 100 may also be used for actuating or disconnecting a control circuit of any equipment with a buckle.

As shown in FIGS. 1 to 20, the buckle 100 of the invention includes a male buckle 110, a female buckle 120, and an actuating structure 130 disposed between the male buckle 110 and the female buckle 120. When the male buckle 110 and the female buckle 120 are engaged, the actuating structure 130 generates an actuating signal. When the male buckle 110 and the female buckle 120 are disengaged, the actuating structure 130 generates a disconnecting signal. The control circuit may be automatically actuated or disconnected according to the actuating signal or the disconnecting signal. The control circuit may also control other electronic components according to the actuating signal or the disconnecting signal.

In the invention, the control circuit may be disposed inside or outside the buckle 100. When the control circuit is actuated, the control circuit may control other electronic components to work.

As shown in FIGS. 1 to 20, in the buckle 100 of the invention, the actuating structure 130 includes a first conductive member 131 and a second conductive member 132. The first conductive member 131 and the second conductive member 132 are disposed on the male buckle 110 and/or the female buckle 120. One of the first conductive member 131 and the second conductive member 132 is electrically connected to the control circuit. The male buckle 110 and the female buckle 120 are engaged or disengaged, such that the first conductive member 131 and the second conductive member 132 are in contact or disconnected to generate the actuating signal or the disconnecting signal. In the following, different embodiments of the buckle 100 of the invention are described with reference to the accompanying drawings, respectively.

Figure 2:
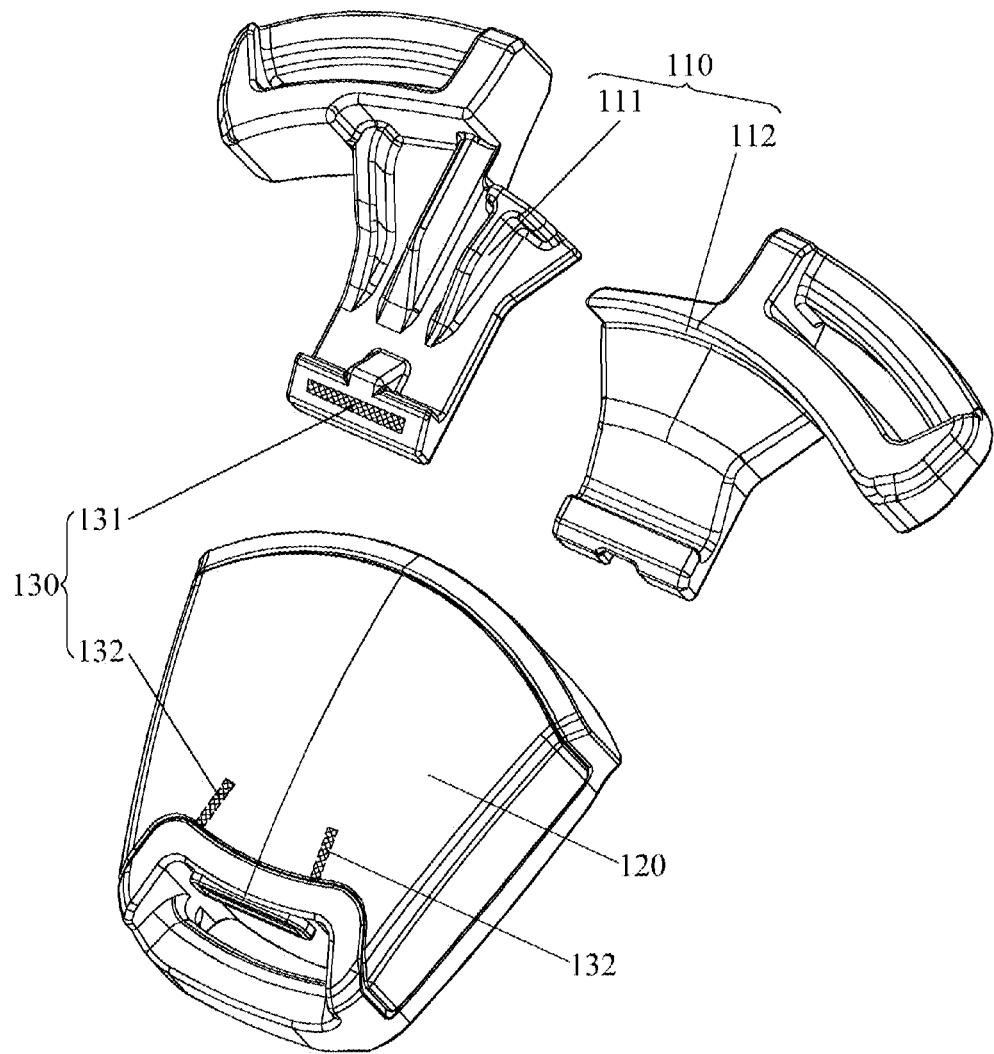
FIG. 2 is an exploded view of FIG. 1.
Figure 3:
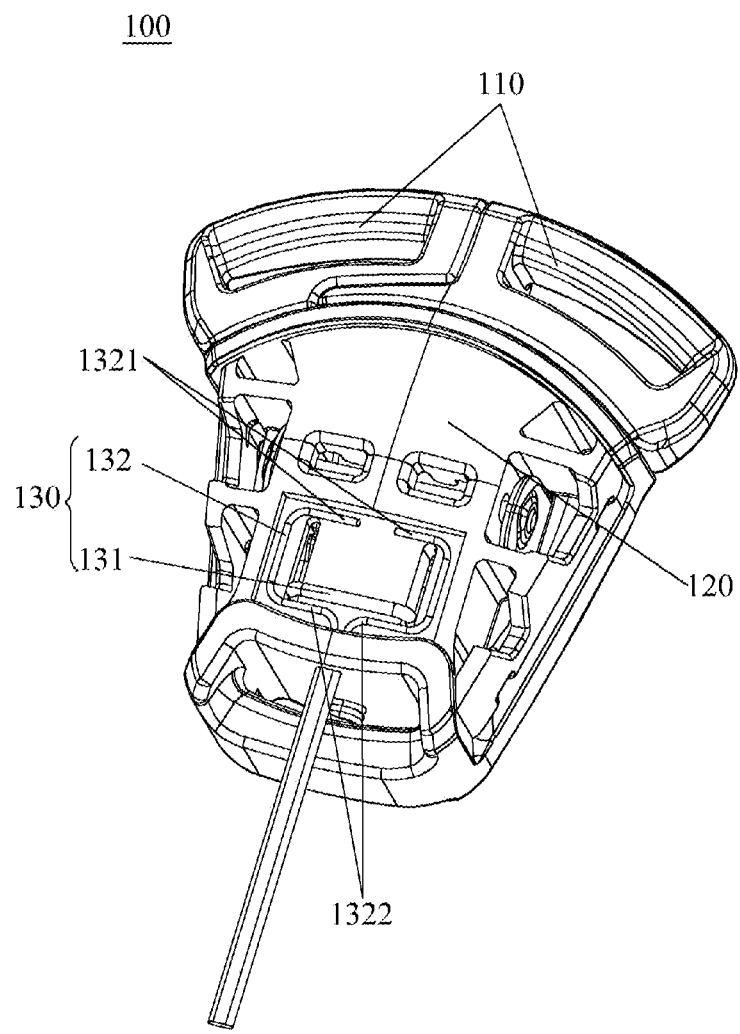
FIG. 3 is a schematic view illustrating the structure of a buckle of a second embodiment of the invention.
Figure 4:
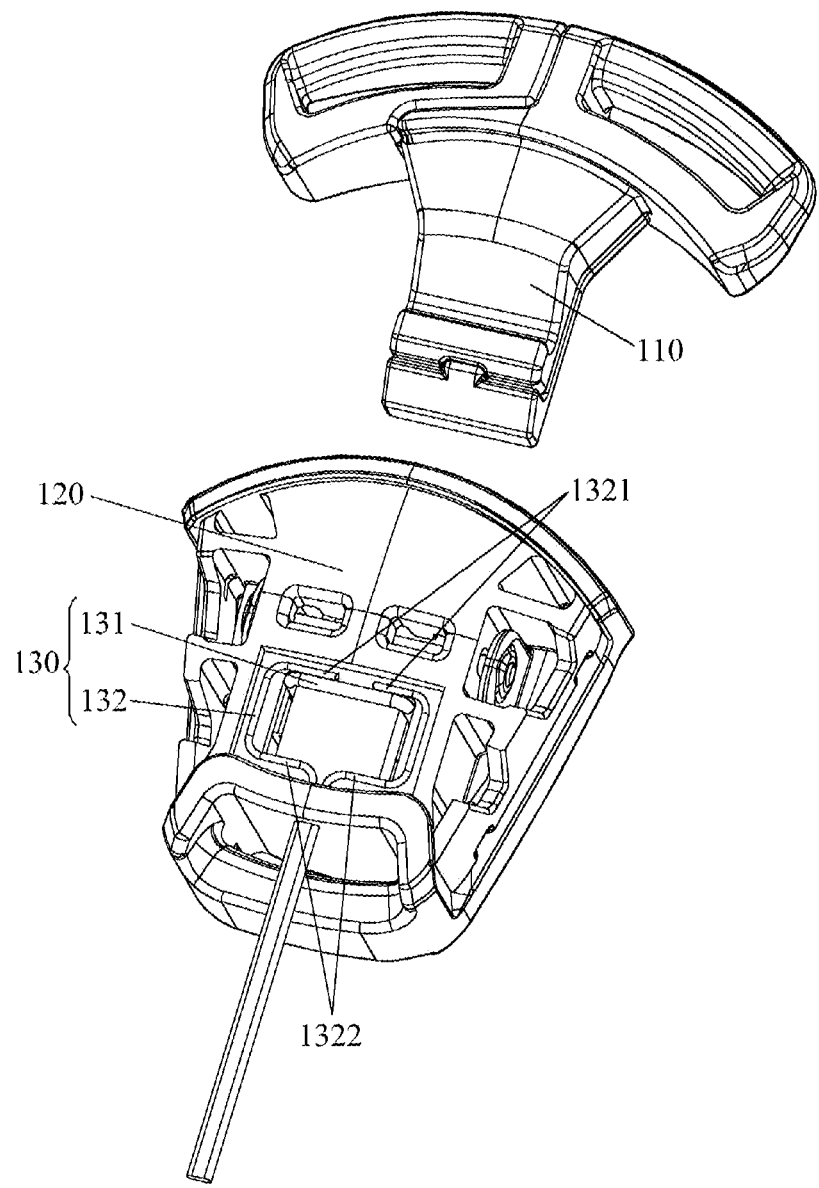
FIG. 4 is a schematic view illustrating another state of FIG. 3.
Figure 5:
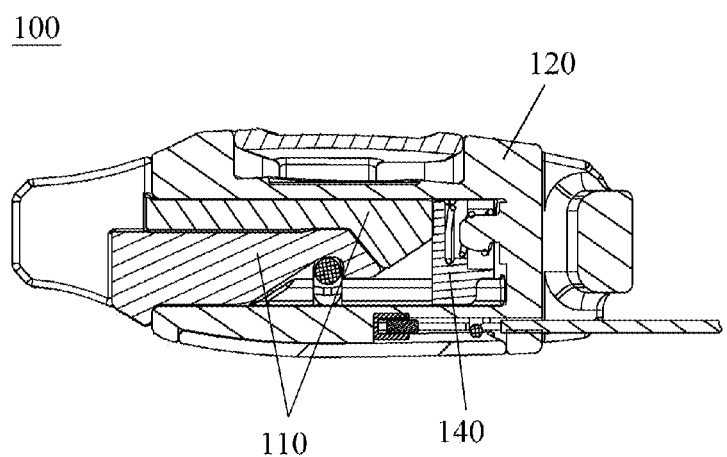
FIG. 5 is a sectional view of FIG. 3.
Figure 5A:
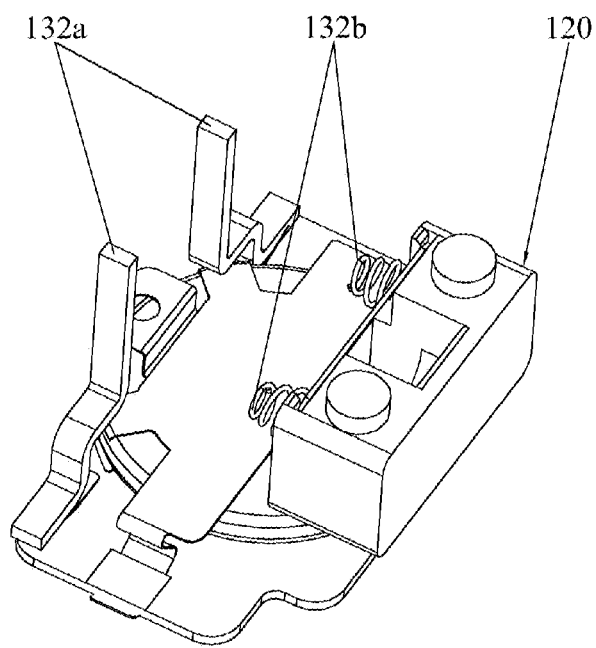
FIG. 5A is a schematic view illustrating the structure inside a female buckle shown in FIG. 3.

As shown in FIGS. 1 and 2, in the first embodiment of the buckle 100 of the invention, one of the first conductive member 131 and the second conductive member 132 is disposed on the male buckle 110 and another one of the first conductive member 131 and the second conductive member 132 is disposed on the female buckle 120. When the male buckle 110 and the female buckle 120 are engaged, the first conductive member 131 and the second conductive member 132 are in contact. When the male buckle 110 and the female buckle 120 are disengaged, the first conductive member 131 and the second conductive member 132 are disconnected.

More specifically, the first conductive member 131 is fixed on the male buckle 110 or integrally formed with the male buckle 110. The second conductive member 132 is disposed on the female buckle 120 and electrically connected to the control circuit. The second conductive member 132 has two contact ends 1321. When the male buckle 110 and the female buckle 120 are engaged, the first conductive member 131 and the two contact ends 1321 of the second conductive member 132 are in contact to make the control circuit conductive. When the male buckle 110 and the female buckle 120 are disengaged, the first conductive member 131 and the two contact ends 1321 of the second conductive member 132 are separated to disconnect the control circuit.

In this embodiment, the first conductive member 131 is a conductive body disposed on the male buckle 110. The conductive body may be formed individually and then fixed on the male buckle 110. The conductive body may also be integrally formed on the male buckle 110 by insert molding. The conductive body may be disposed on a first buckle body 111 and/or a second buckle body 112 of the male buckle 110. Furthermore, the second conductive member 132 is two conductive wires disposed on the female buckle 120. The two conductive wires are electrically connected to the control circuit and not conductive with each other. When the male buckle 110 and the female buckle 120 are engaged, the conductive body of the male buckle 110 and the two conductive wires of the female buckle 120 are in contact to make the control circuit conductive. When the male buckle 110 is disengaged from the female buckle 120, the conductive body is separated from the two conductive wires to disconnect the control circuit.

Needless to say, the actuating structure 130 is not limited to the aforesaid arrangement. In another embodiment of the buckle 100 of the invention, the first conductive member 131 and the second conductive member 132 of the actuating structure 130 are disposed on the female buckle 120 and an automatic ejection member 140 in the female buckle 120 is used to make the first conductive member 131 and the second conductive member 132 in contact or separate, wherein the automatic ejection member 140 is a device used to eject the male buckle 110 out of the female buckle 120. These embodiments are described in the following.

In some embodiments, the second conductive member 132 is two conductive wires disposed on the female buckle 120. The two conductive wires are electrically connected to the control circuit and not conductive with each other. The first conductive member 131 is a metal elastic plate of the automatic ejection member 140. When the male buckle 110 and the female buckle 120 are engaged, the male buckle 110 pushes the metal elastic plate of the automatic ejection member 140 to make the metal elastic plate and the two conductive wires in contact and then make the control circuit conductive. Consequently, the control circuit is actuated. On the other hand, when the male buckle 110 is disengaged from the female buckle 120, the metal elastic plate of the automatic ejection member 140 recovers to make the metal elastic plate and the two conductive wires separate. Consequently, the control circuit is disconnected.

Needless to say, the structure of the automatic ejection member 140 is not limited to the aforesaid embodiment. The automatic ejection member 140 may be implemented by a combination of a metal plate and a spring. At this time, when the male buckle 110 and the female buckle 120 are engaged, the male buckle 110 pushes the metal plate and deforms the spring, such that the metal plate and the two conductive wires are in contact to make the control circuit conductive. When the male buckle 110 is disengaged from the female buckle 120, the spring recovers to push and return the metal plate, such that the metal plate and the two conductive wires are separated to disconnect the control circuit.

In other embodiments, the first conductive member 131 is arranged individually and fixed on the automatic ejection member 140. When the male buckle 110 and the female buckle 120 are engaged, the male buckle 110 pushes the automatic ejection member 140 to drive the first conductive member 131 to move to make the first conductive member 131 and the second conductive member 132 in contact or separate, so as to make the control circuit conductive or disconnected.

As shown in FIGS. 3 to 5A, in the second embodiment of the buckle 100 of the invention, the first conductive member 131 is fixed to the automatic ejection member 140 disposed in the female buckle 120. The first conductive member 131 is a metal rod. The second conductive member 132 is fixed in the female buckle 120 and electrically connected to the control circuit. The second conductive member 132 is a metal buckle having two contact ends 1321 apart from each other. A tail end 1322 of the second conductive member 132 away from the two contact ends 1321 is connected to the control circuit by a wire. When the male buckle 110 and the female buckle 120 are engaged, the male buckle 110 pushes the automatic ejection member 140 to drive the first conductive member 131 to move to make the first conductive member 131 and the two contact ends 1321 of the second conductive member 132 in contact or separate.

More specifically, the second conductive member 132 is fixed on the female buckle 120 and the two contact ends 1321 are close to a receiving end of the female buckle 120. The first conductive member 131 is slidably engaged in an engaging groove of the female buckle 120 and located between the two contact ends 1321 and the tail end 1322. When the male buckle 110 is inserted into the female buckle 120, the male buckle 110 pushes the automatic ejection member 140 to move and compress an elastic member therein. The automatic ejection member 140 drives the first conductive member 131 to move, such that the first conductive member 131 is separated from the two contact ends 1321 of the second conductive member 132 to disconnect the control circuit. On the other hand, when the male buckle 110 is disengaged from the female buckle 120, the automatic ejection member 140 automatically returns to push the first conductive member 131 to move, such that the first conductive member 131 contacts the two contact ends 1321 of the second conductive member 132 to make the control circuit closed.

Needless to say, the first conductive member 131 and the second conductive member 132 are not limited to the aforesaid arrangement. The relative position between the first conductive member 131 and the second conductive member 132 may change. For example, the first conductive member 131 may be located between the two contact ends 1321 of the second conductive member 132 and the receiving end of the female buckle 120. When the male buckle 110 is inserted into the female buckle 120, the male buckle 110 pushes the automatic ejection member 140 and drives the first conductive member 131 to move, such that the first conductive member 131 contacts the two contact ends 1321 of the second conductive member 132 to make the control circuit conductive. On the other hand, when the male buckle 110 is disengaged from the female buckle 120, the automatic ejection member 140 returns and pushes the first conductive member 131 to move, such that the first conductive member 131 is separated from the two contact ends 1321 of the second conductive member 132 to disconnect the control circuit.

It should be noted that the first conductive member 131 is not limited to the metal rod of this embodiment and the second conductive member 132 is not limited to the metal buckle of this embodiment. The first conductive member 131 and the second conductive member 132 may be arranged by other manners. For example, in another embodiment, the first conductive member 131 may be two metal springs 132b connected to the automatic ejection member 140, wherein the two metal springs 132b may be connected by a metal wire or formed as a one-piece structure by a metal wire. The second conductive member 132 may be two conductive pillars 132a fixed in the female buckle 120. The two conductive pillars 132a are electrically connected to the control circuit, and a distance between the two conductive pillars 132a corresponds to a distance between the two metal springs 132b. Accordingly, when the male buckle 110 and the female buckle 120 are engaged, the male buckle 110 pushes the automatic ejection member 140 to make the two metal springs 132b and the two conductive pillars 132a in contact, so as to make the control circuit conductive. On the other hand, when the male buckle 110 is disengaged from the female buckle 120, the automatic ejection member 140 automatically ejects to separate the two metal springs 132b and the two conductive pillars 132a to disconnect the control circuit.

In the invention, by means of using the automatic ejection member 140 to make the first conductive member 131 and the second conductive member 132 in contact or separate, the actuating structure 130 may be implemented by other structures.

Figure 6:
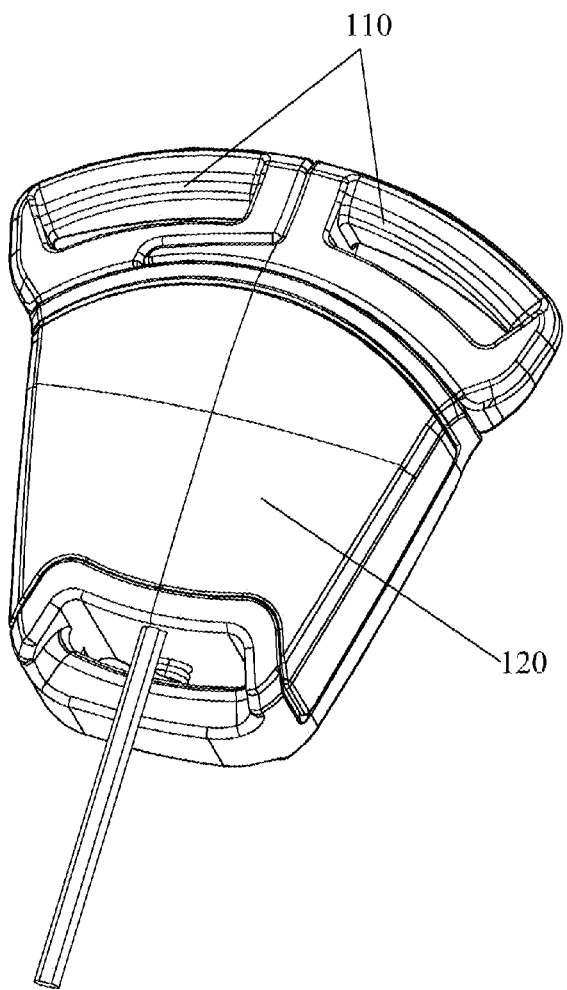
FIG. 6 is a schematic view illustrating the structure of a buckle of a third embodiment of the invention.
Figure 7:
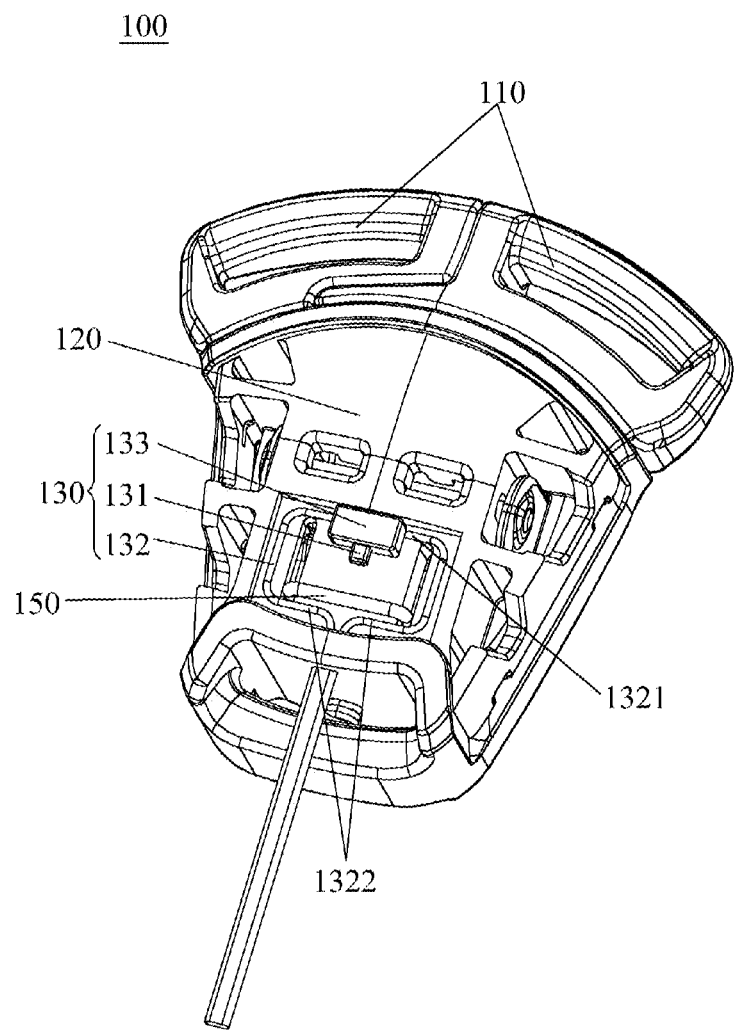
FIG. 7 is a schematic view illustrating the structure of a female buckle shown in FIG. 6 without a cover.
Figure 8:
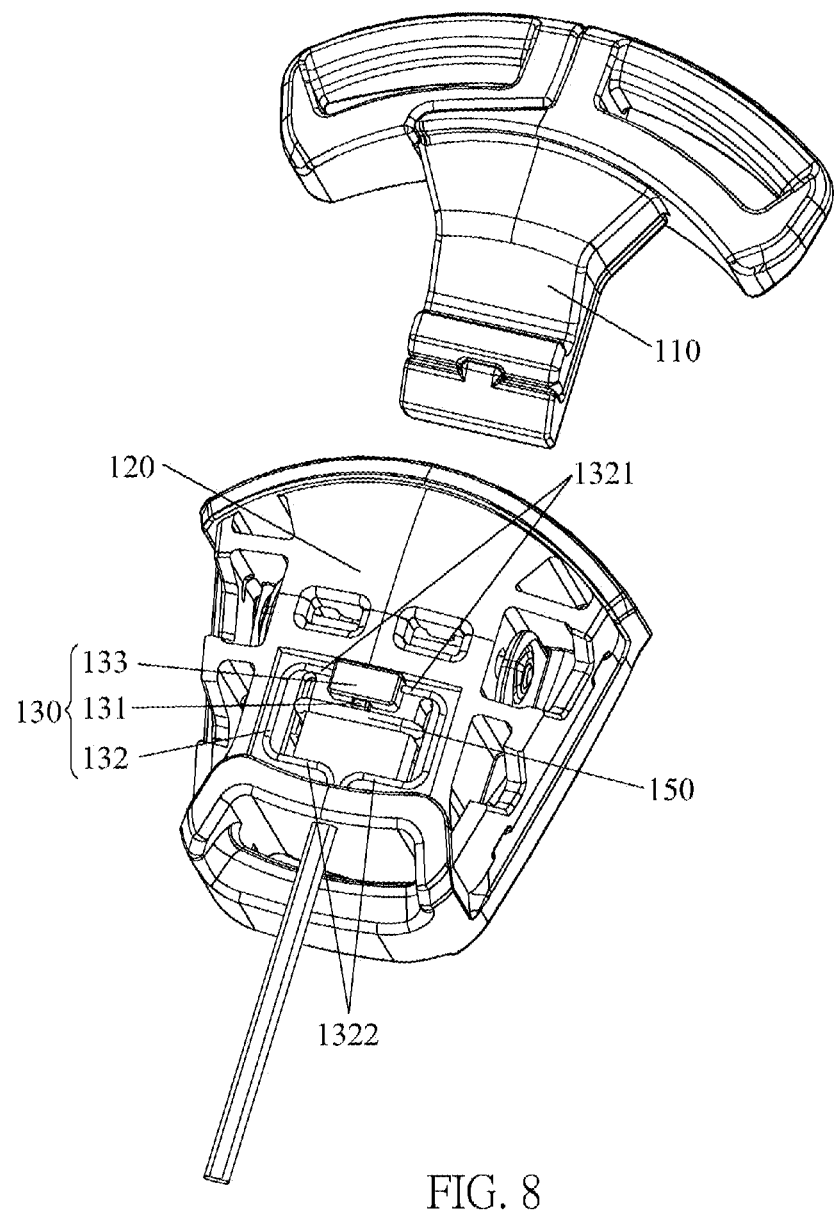
FIG. 8 is a schematic view illustrating a separated state of a male buckle and a female buckle shown in FIG. 7.

As shown in FIGS. 6 to 8, in the third embodiment of the buckle 100 of the invention, the arrangement of the second conductive member 132 is identical to the aforesaid second embodiment. That is to say, the second conductive member 132 is a metal buckle having two contact ends 1321 apart from each other, wherein the two contact ends 1321 are close to the receiving end of the female buckle 120 and the tail end 1322 of the second conductive member 132 is connected to the control circuit by a wire. However, in this embodiment, the structure of the first conductive member 131 is different from the aforesaid second embodiment. The first conductive member 131 of this embodiment is a switch disposed on the female buckle 120. The switch is disposed with respect to the two contact ends 1321 of the second conductive member 132. The two contact ends 1321 are conducted or disconnected by the switch.

As shown in FIGS. 7 and 8, the actuating structure 130 further includes a movable member 150 connected to the automatic ejection member 140 and slidably engaged in an engaging groove of the female buckle 120. When the male buckle 110 and the female buckle 120 are engaged, the male buckle 110 drives the movable member 150 to move through the automatic ejection member 140, such that the movable member 150 detachably acts on the switch to make the switch and the second conductive member 132 in contact or separate. In this embodiment, the movable member 150 is located between the two contact ends 1321 and the tail end 1322 of the second conductive member 132. The switch is disposed at a position corresponding to the two contact ends 1321 of the second conductive member 132 by an installation base 133. The switch is located between the movable member 150 and the two contact ends 1321 of the second conductive member 132. Accordingly, when the male buckle 110 and the female buckle 120 are engaged, the automatic ejection member 140 drives the movable member 150 to move away from the switch (as shown in FIG. 7) to disconnect the control circuit. When the male buckle 110 and the female buckle 120 are disengaged, the automatic ejection member 140 automatically returns to push the movable member 150 to move to press the switch (as shown in FIG. 8), such that the switch and the two contact ends 1321 of the second conductive member 132 are in contact and the control circuit is closed.

Figure 9:
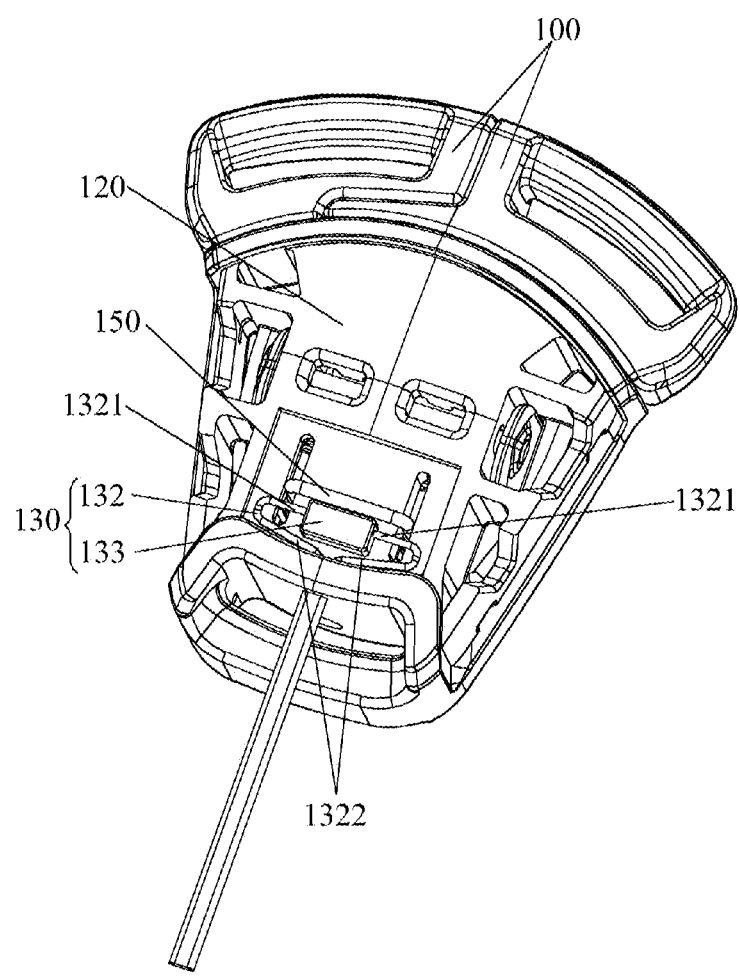
FIG. 9 is a sectional view illustrating the structure of a buckle of a fourth embodiment of the invention.
Figure 10:
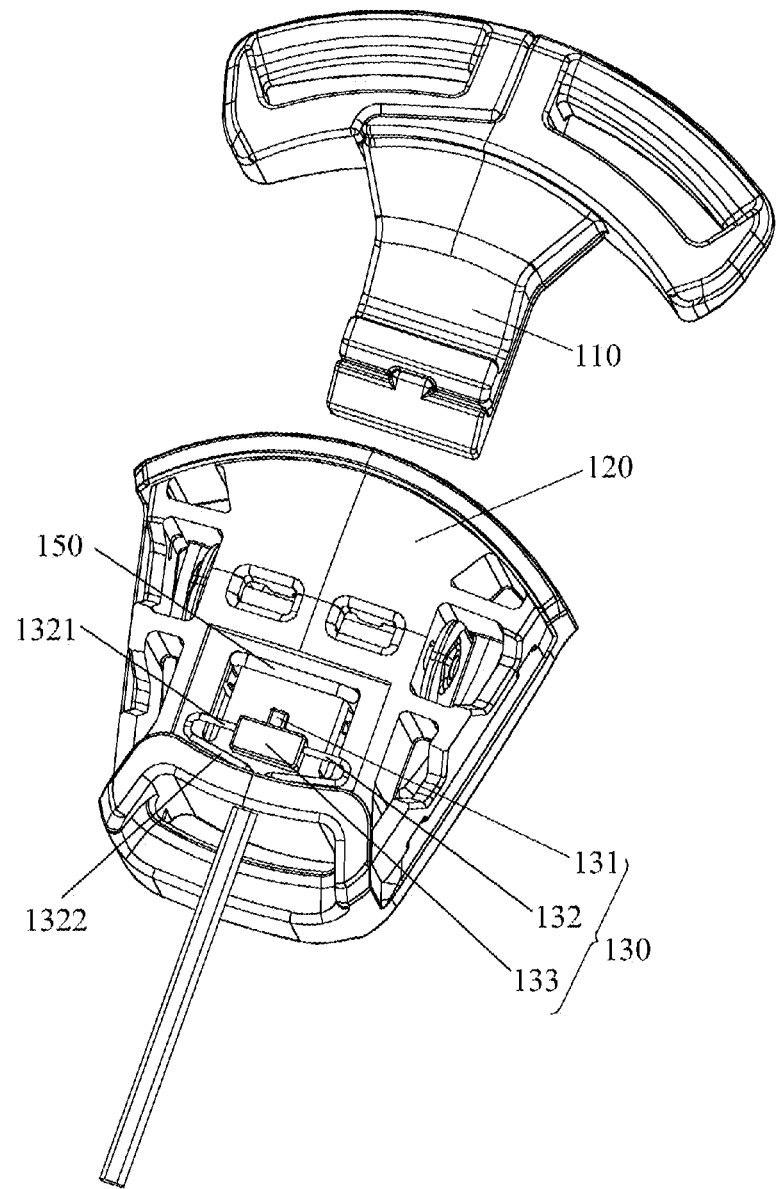
FIG. 10 is a schematic view illustrating a separated state of a male buckle and a female buckle shown in FIG. 9.

As shown in FIGS. 9 and 10, in the fourth embodiment of the buckle 100 of the invention, the difference between this embodiment and the aforesaid third embodiment is the relative position between the movable member 150 and the second conductive member 132 and the installation direction of the switch. Specifically, the movable member 150 is disposed between the two contact ends 1321 of the second conductive member 132 and the receiving end of the female buckle 120. The switch is disposed at a position corresponding to the two contact ends 1321 of the second conductive member 132 by an installation base 133 and the switch is close to the movable member 150. Accordingly, when the male buckle 110 and the female buckle 120 are engaged, the male buckle 110 pushes the automatic ejection member 140 to drive the movable member 150 to press the switch (as shown in FIG. 9), such that the switch and the two contact ends 1321 of the second conductive member 132 are in contact and the control circuit is closed. When the male buckle 110 and the female buckle 120 are disengaged, the automatic ejection member 140 ejects to drive the movable member 150 to move away from the switch. The switch automatically ejects to be separated from the two contact ends 1321 of the second conductive member 132 (as shown in FIG. 10), so as to disconnect the control circuit. Other parts that are the same as the above embodiments will not be repeated herein.

It should be noted that the conduction and disconnection of the control circuit are not limited to the aforesaid structures. In other embodiments of the buckle 100 of the invention, a sensor 160 may be used to sense an engaging state between the male buckle 110 and the female buckle 120, so as to make the control circuit conductive or disconnected.

Figure 11:
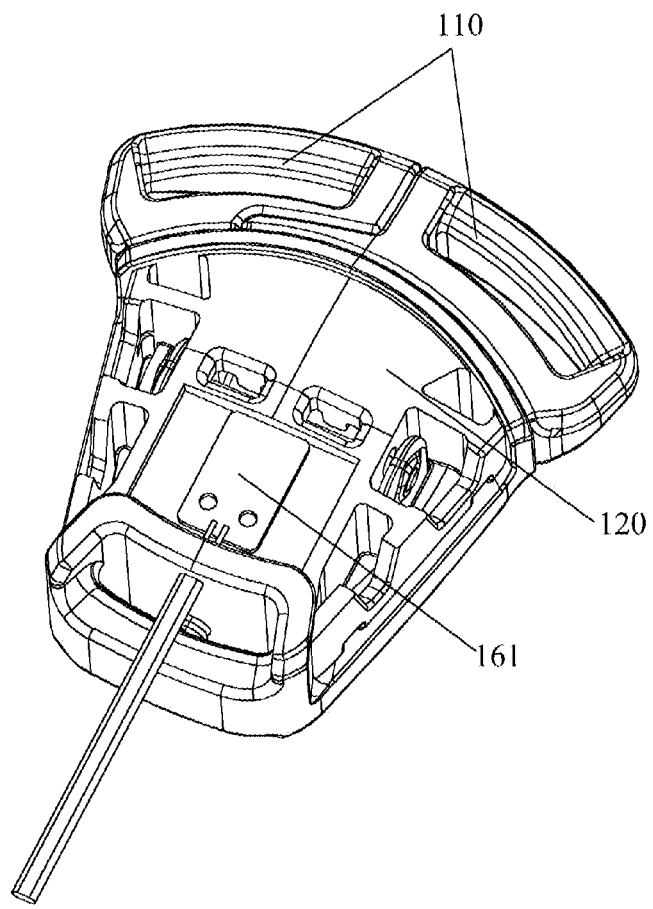
FIG. 11 is a sectional view illustrating the structure of a buckle of a fifth embodiment of the invention.
Figure 12:
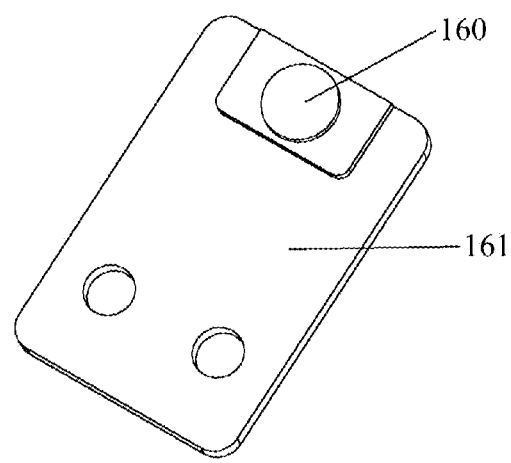
FIG. 12 is a schematic view illustrating the structure of a sensor shown in FIG. 11.
Figure 13:
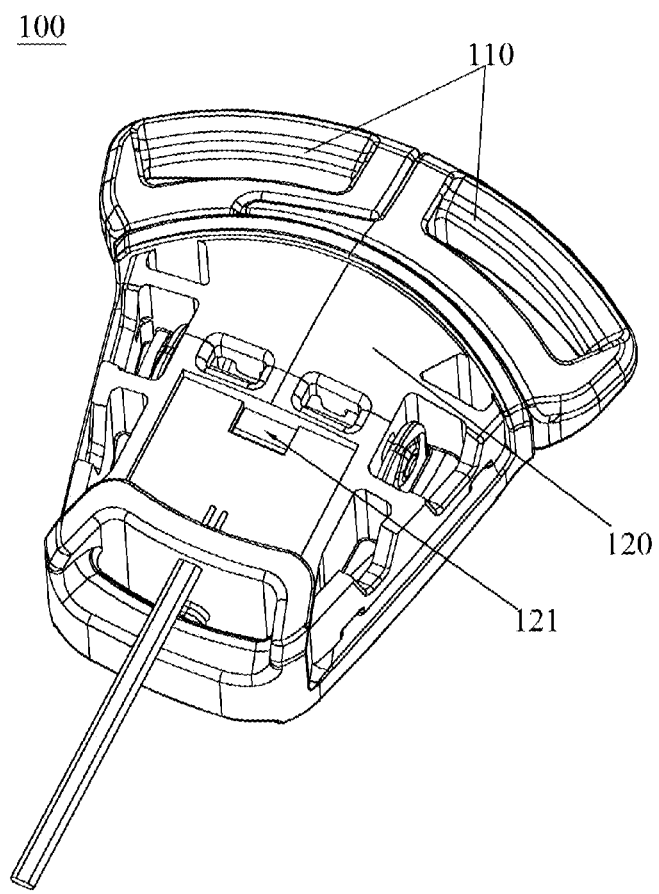
FIG. 13 is a schematic view illustrating the structure of FIG. 11 without a sensor.
Figure 14:
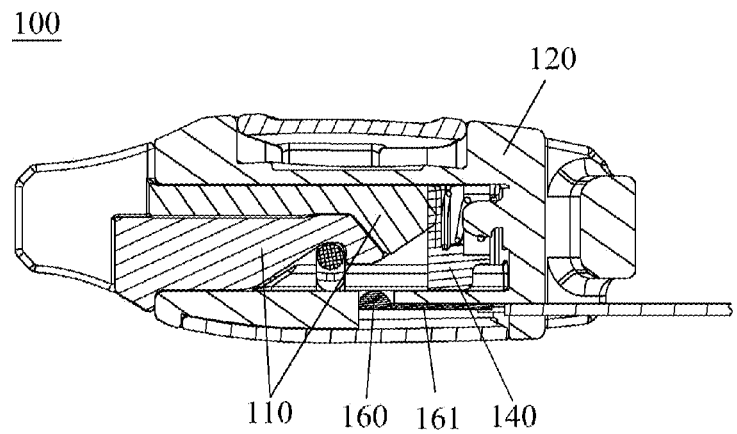
FIG. 14 is a sectional view of FIG. 11.
Figure 15:
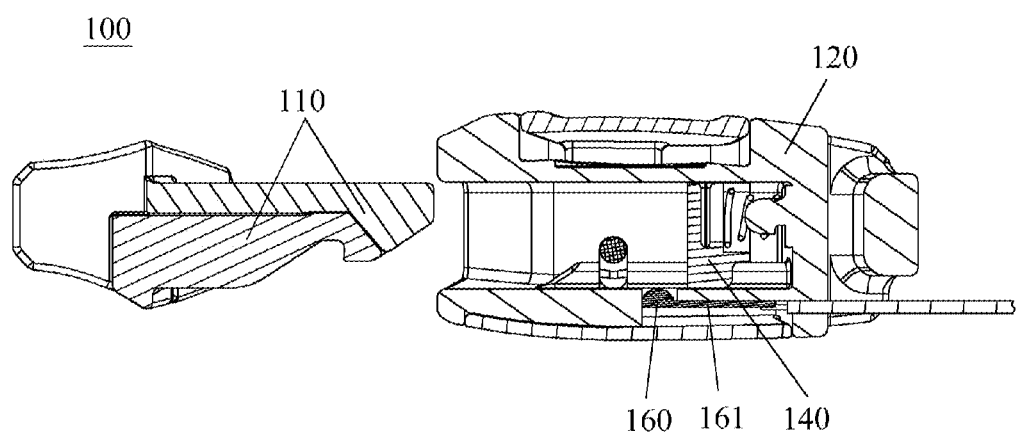
FIG. 15 is a schematic view illustrating a separated state of a male buckle and a female buckle shown in FIG. 14.
Figure 16:
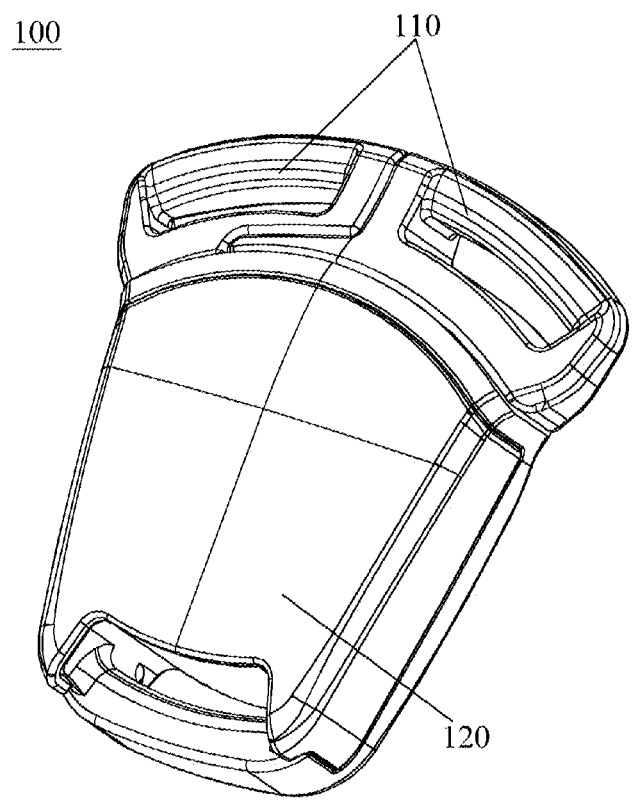
FIG. 16 is a sectional view illustrating the structure of a buckle of a sixth embodiment of the invention.
Figure 17:
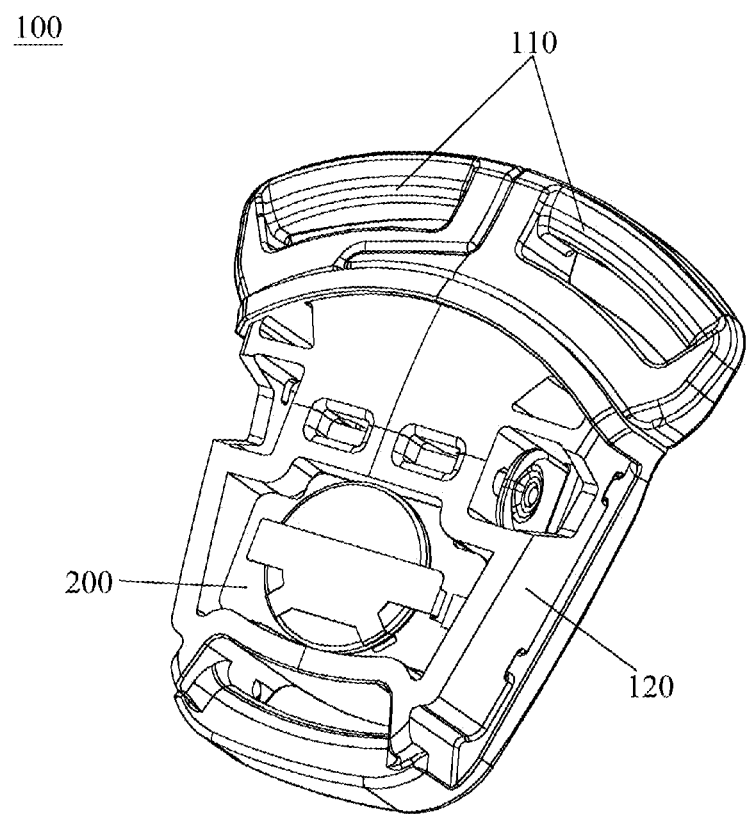
FIG. 17 is a schematic view illustrating the structure of a female buckle shown in FIG. 16 without a cover.
Figure 18:
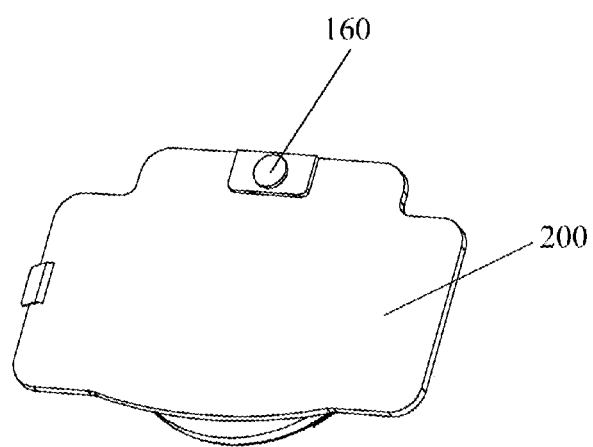
FIG. 18 is a schematic view illustrating the structure of a sensor and a control circuit shown in FIG. 17.

Specifically, as shown in FIGS. 11 to 15, in the fifth embodiment of the buckle 100 of the invention, the actuating structure 130 includes a sensor 160 disposed in the female buckle 120 and electrically connected to the control circuit. As shown in FIG. 13, the female buckle 120 has a hole 121 communicating with a slot for receiving the male buckle 110. The sensor 160 is disposed on a bottom of the female buckle 120 and capable of sensing whether the male buckle 110 is engaged through the hole 121 (as shown in FIGS. 14 and 15). When the male buckle 110 and the female buckle 120 are engaged, the sensor 160 senses the male buckle 110.

When the male buckle 110 and the female buckle 120 are disengaged, the sensor 160 cannot sense the male buckle 110. The sensor 160 may send out different sensing signals. The control circuit is conducted or disconnected according to the sensing signals or the control circuit controls other electronic components according to different sensing signals of the sensor 160.

As show in FIGS. 11 and 12, the sensor 160 is disposed on the bottom of the female buckle 120 through a circuit board 161. The circuit board 161 may be connected to the control circuit by a wired or wireless manner. Accordingly, when the sensor senses the male buckle 110, the sensor 160 may transmit the sensing signal to the control circuit by the wired or wireless manner, such that the control circuit actuates the electronic components correspondingly. When the sensor 160 does not sense the male buckle 110, the circuit board 161 transmits the signal to the control circuit by the wired or wireless manner, such that the control circuit switches off the electronic components.

Figure 19:
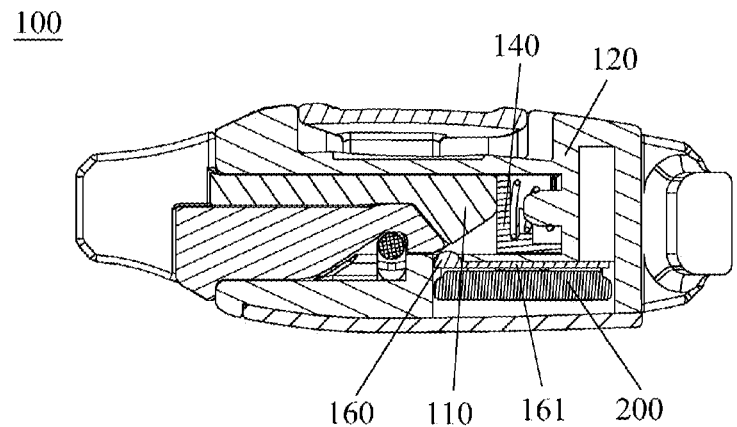
FIG. 19 is a sectional view of FIG. 16.
Figure 20:
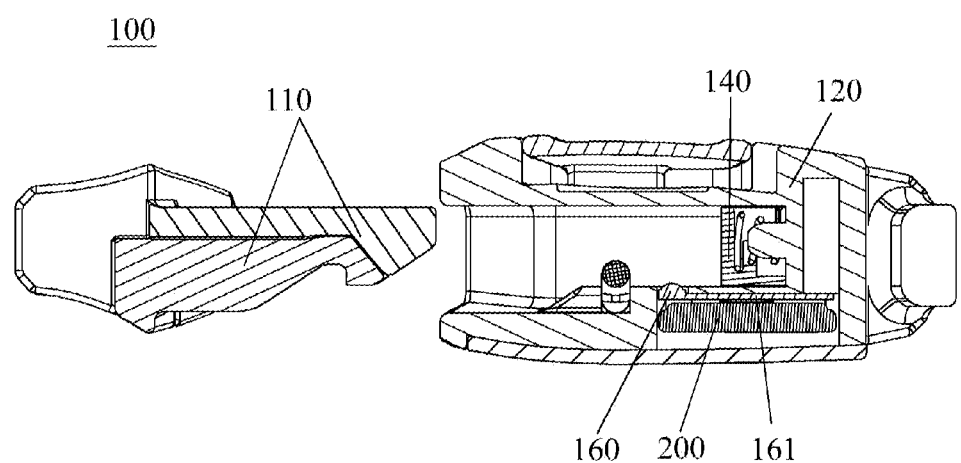
FIG. 20 is a schematic view illustrating a separated state of a male buckle and a female buckle shown in FIG. 19.

As shown in FIGS. 16 to 20, in the sixth embodiment of the buckle 100 of the invention, the difference between this embodiment and the aforesaid fifth embodiment is that the control circuit 200 is disposed in the female buckle 120, and the circuit board 161 connected to the sensor 160 is disposed above and communicates with the control circuit 200 (as shown in FIGS. 19 and 20). The sensing manner and principle of the sensor 160 are the same as the aforesaid fifth embodiment and will not be repeated herein.

Furthermore, another difference in this embodiment is that the control circuit 200 further includes a Bluetooth module, wherein the Bluetooth module is used to connect an external alarm device (e.g. mobile phone, tablet computer, etc.) by Bluetooth communication. When the sensor 160 senses that the male buckle 110 and the female buckle 120 are engaged or disengaged, the control circuit 200 actuates the Bluetooth module and transmits a signal to the alarm device through the Bluetooth module, wherein the signal indicates that the male buckle 110 is engaged or disengaged. When the alarm device does not receive a Bluetooth signal, the alarm device sends out an alarm.

It should be noted that for the buckle 100 of the invention, when the control circuit is disposed outside a buckle, the Bluetooth module may also be disposed on the control circuit to connect the alarm device by Bluetooth communication.

The control circuit of the invention includes a communication module configured to communicate with an external mobile device. The communication module instantly sends the current state of the buckle (engaged or disengaged) to the mobile device, such that a user can instantly know the current state of the buckle. Specifically, the mobile device may be a mobile phone, a tablet computer, an in-vehicle device, a smart TV, a magnetic button, a smart key and other electronic devices with sound and/or light and/or display functions. For example, the mobile device may show the current state of the buckle by different sounds, the mobile device may show the current state of the buckle by different lights, or the mobile device may show the current state of the buckle by different images, symbols, or text. Needless to say, the mobile device may also show the current state of the buckle by at least one of sound, light, and display functions.

As mentioned in the above, the buckle 100 of the invention has the actuating structure 130 disposed between the male buckle 110 and the female buckle 120. When the male buckle 110 and the female buckle 120 are engaged, the actuating structure 130 generates the actuating signal. When the male buckle 110 and the female buckle 120 are disengaged, the actuating structure 130 generates the disconnecting signal. The control circuit operates according to the actuating signal or the disconnecting signal, such that the control circuit can be actuated conveniently and the structure of the buckle is simple.

The structure and engaging manner of the male buckle 110 and the female buckle 120 involved in the buckle 100 of the invention are well known in the art, so the explanation will not be depicted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed:

1. A buckle comprising:
a control circuit configured to operate according to an actuating signal configured to close the control circuit or a disconnecting signal configured to disconnect the control circuit;
a male buckle; and
a female buckle comprising an automatic ejection member and a conductive member electrically connected to the control circuit,
wherein, when the male buckle and the female buckle are engaged, the male buckle moves the automatic ejection member to make a conductive portion of the automatic ejection member and the conductive member in contact or separate and generate the actuating signal by closing or disconnecting, respectively, the control circuit.

2. The buckle of claim 1, wherein the conductive member comprises a conductive wire disposed on the female buckle.

3. The buckle of claim 1, wherein:
the conductive member comprises two contact ends apart from each other;
when the male buckle and the female buckle are engaged, the male buckle moves the automatic ejection member to make the conductive portion of the automatic ejection member and the two contact ends of the conductive member in contact to close the control circuit; and
when the male buckle and the female buckle are disengaged, the automatic ejection member and the two contact ends of the conductive member separate to disconnect the control circuit.

4. The buckle of claim 1, wherein:
the automatic ejection member comprises a first conductive member;
the conductive member is a second conductive member; and
when the male buckle and the female buckle are engaged, the male buckle pushes the automatic ejection member to drive the first conductive member to move to make the first conductive member and the second conductive member in contact or separate to generate the actuating signal.

5. The buckle of claim 4, wherein:
when the male buckle and the female buckle are engaged, the male buckle pushes the automatic ejection member to drive the first conductive member to move away from the second conductive member to make the first conductive member and the second conductive member separate and generate the actuating signal by disconnecting the control circuit; and
when the male buckle and the female buckle are disengaged, the automatic ejection member automatically returns to drive the first conductive member to move to make the first conductive member and the second conductive member in contact and generate the disconnecting signal by closing the control circuit.

6. The buckle of claim 4, wherein:
when the male buckle and the female buckle are engaged, the male buckle pushes the automatic ejection member to drive the first conductive member to move to make the first conductive member and the second conductive member in contact and generate the actuating signal by closing the control circuit; and
when the male buckle and the female buckle are disengaged, the automatic ejection member ejects to drive the first conductive member to move away from the second conductive member to make the first conductive member and the second conductive member separate and generate the disconnecting signal by disconnecting the control circuit.

7. The buckle of claim 4, wherein:
the first conductive member comprises a metal elastic plate;
when the male buckle and the female buckle are engaged, the male buckle pushes the metal elastic plate to make the metal elastic plate and the second conductive member in contact and generate the actuating signal by closing the control circuit; and
when the male buckle and the female buckle are disengaged, the metal elastic plate recovers to make the metal elastic plate and the second conductive member separate and generate the disconnecting signal by disconnecting the control circuit.

8. The buckle of claim 4, wherein:
the first conductive member comprises two metal springs formed as a one-piece structure;
the second conductive member comprises two conductive pillars electrically connected to the control circuit;
when the male buckle and the female buckle are engaged, the male buckle pushes the automatic ejection member to make the two metal springs and the two conductive pillars in contact and generate the actuating signal by closing the control circuit; and
when the male buckle and the female buckle are disengaged, the automatic ejection member ejects to make the two metal springs and the two conductive pillars separate and generate the disconnecting signal by disconnecting the control circuit.

9. The buckle of claim 4, wherein:
the first conductive member comprises a metal rod;
the second conductive member comprises a metal buckle having two contact ends apart from each other;
a tail end of the second conductive member away from the two contact ends is connected to the control circuit by a wire; and
when the male buckle and the female buckle are engaged, the male buckle pushes the automatic ejection member to drive the first conductive member to move to make the metal rod of the first conductive member and two contact ends of the second conductive member in contact or separate to generate the actuating signal by closing or disconnecting, respectively, the control circuit.

10. The buckle of claim 1, wherein:
the automatic ejection member comprises a movable member and a switch electrically connected to the control circuit; and
when the male buckle and the female buckle are engaged, the male buckle pushes the automatic ejection member to drive the movable member to detachably act on the switch to make the switch and the conductive member in contact or separate to generate the actuating signal.

11. The buckle of claim 10, wherein:
when the male buckle and the female buckle are engaged, the male buckle pushes the automatic ejection member to drive the movable member to move away from the switch to make the switch and the conductive member separate and generate the actuating signal by disconnecting the control circuit; and
when the male buckle and the female buckle are disengaged, the automatic ejection member automatically returns to push the movable member to press the switch to make the switch and the conductive member in contact and generate the disconnecting signal by closing the control circuit.

12. The buckle of claim 10, wherein:
when the male buckle and the female buckle are engaged, the male buckle pushes the automatic ejection member to drive the movable member to press the switch to make the switch and the conductive member in contact and generate the actuating signal by closing the control circuit; and
when the male buckle and the female buckle are disengaged, the automatic ejection member ejects to drive the movable member to move away from the switch to make the switch and the conductive member separate and generate the disconnecting signal by disconnecting the control circuit.

13. A buckle comprising:
a control circuit configured to be one of closed or disconnected;
a male buckle; and
a female buckle comprising an automatic ejection member and a conductive member electrically connected to the control circuit,
wherein, when the male buckle and the female buckle are engaged, the male buckle moves the automatic ejection member to make a conductive portion of the automatic ejection member and the conductive member in contact or separate and close or disconnect, respectively, the control circuit.

14. The buckle of claim 13, wherein:
the automatic ejection member comprises a first conductive member;
the conductive member is a second conductive member; and
when the male buckle and the female buckle are engaged, the male buckle pushes the automatic ejection member to drive the first conductive member to move to make the first conductive member and the second conductive member in contact or separate to close or disconnect, respectively, the control circuit.

15. The buckle of claim 14, wherein:
when the male buckle and the female buckle are engaged, the male buckle pushes the automatic ejection member to drive the first conductive member to move away from the second conductive member to make the first conductive member and the second conductive member separate to disconnect the control circuit; and
when the male buckle and the female buckle are disengaged, the automatic ejection member automatically returns to drive the first conductive member to move to make the first conductive member and the second conductive member in contact to close the control circuit.

16. The buckle of claim 14, wherein:
when the male buckle and the female buckle are engaged, the male buckle pushes the automatic ejection member to drive the first conductive member to move to make the first conductive member and the second conductive member in contact to close the control circuit; and
when the male buckle and the female buckle are disengaged, the automatic ejection member ejects to drive the first conductive member to move away from the second conductive member to make the first conductive member and the second conductive member separate to disconnect the control circuit.

17. The buckle of claim 13, wherein:
the automatic ejection member comprises a movable member and a switch electrically connected to the control circuit; and
when the male buckle and the female buckle are engaged, the male buckle pushes the automatic ejection member to drive the movable member to detachably act on the switch to make the switch and the conductive member in contact or separate to close or disconnect, respectively, the control circuit.

18. The buckle of claim 17, wherein:
when the male buckle and the female buckle are engaged, the male buckle pushes the automatic ejection member to drive the movable member to move away from the switch to make the switch and the conductive member separate to disconnect the control circuit; and
when the male buckle and the female buckle are disengaged, the automatic ejection member automatically returns to push the movable member to press the switch to make the switch and the conductive member in contact to close the control circuit.

19. The buckle of claim 17, wherein:
when the male buckle and the female buckle are engaged, the male buckle pushes the automatic ejection member to drive the movable member to press the switch to make the switch and the conductive member in contact to close the control circuit; and
when the male buckle and the female buckle are disengaged, the automatic ejection member ejects to drive the movable member to move away from the switch to make the switch and the conductive member separate to disconnect the control circuit.

20. A method of manufacturing a buckle, the method comprising:
forming a control circuit configured to be one of closed or disconnected;
forming a male buckle; and
forming a female buckle comprising an automatic ejection member and a conductive member electrically connected to the control circuit,
wherein, when the male buckle and the female buckle are engaged, the male buckle moves the automatic ejection member to make a conductive portion of the automatic ejection member and the conductive member in contact or separate to close or disconnect, respectively, the control circuit.

* * * * *